(12) United States Patent
Pahl

(10) Patent No.: US 8,459,592 B2
(45) Date of Patent: Jun. 11, 2013

(54) FUSELAGE NOSE DOOR

(75) Inventor: Günter Pahl, Hamburg (DE)

(73) Assignee: Airbus Operations GmbH (DE)

( * ) Notice: Subject to any disclaimer, the term of this patent is extended or adjusted under 35 U.S.C. 154(b) by 476 days.

(21) Appl. No.: 12/751,000

(22) Filed: Mar. 31, 2010

(65) Prior Publication Data

US 2010/0252682 A1 Oct. 7, 2010

Related U.S. Application Data

(60) Provisional application No. 61/167,266, filed on Apr. 7, 2009.

(30) Foreign Application Priority Data

Apr. 7, 2009 (DE) .................. 10 2009 016 769

(51) Int. Cl.
*B64C 1/14* (2006.01)

(52) U.S. Cl.
USPC .................. 244/129.5; 244/129.4; 244/118.1; 244/120; 244/121; 296/155

(58) Field of Classification Search
USPC ............. 244/129.4, 129.5, 118.1, 118.2, 120, 244/121, 137.1, 118.3; 296/155
See application file for complete search history.

(56) References Cited

U.S. PATENT DOCUMENTS

| | | | | |
|---|---|---|---|---|
| 2,332,158 A | * | 10/1943 | Magill et al. | 244/121 |
| 3,128,068 A | * | 4/1964 | Pauli | 244/129.5 |
| 3,374,972 A | * | 3/1968 | Webb, Sr. | 244/137.1 |
| 3,416,757 A | * | 12/1968 | Maraghe | 244/129.5 |
| 3,464,161 A | * | 9/1969 | Jonsson | 49/197 |
| 3,618,881 A | * | 11/1971 | Fellers et al. | 244/121 |
| 4,470,566 A | * | 9/1984 | Fitzgerald | 244/129.5 |
| 4,544,198 A | * | 10/1985 | Ochiai et al. | 296/155 |
| 4,991,905 A | * | 2/1991 | Watanabe et al. | 296/155 |
| 5,072,898 A | * | 12/1991 | Amelio | 244/129.4 |
| 5,181,677 A | * | 1/1993 | Kaplan et al. | 244/129.5 |
| 5,205,516 A | * | 4/1993 | Bright et al. | 244/121 |
| 5,544,449 A | * | 8/1996 | Amelio et al. | 49/383 |
| 5,673,874 A | * | 10/1997 | Howard | 244/129.5 |
| 6,029,928 A | * | 2/2000 | Kelly | 244/2 |

(Continued)

FOREIGN PATENT DOCUMENTS

| | | |
|---|---|---|
| DE | 19642196 C1 | 1/1998 |
| FR | 2783495 A1 | 3/2000 |

*Primary Examiner* — Isam Alsomiri
*Assistant Examiner* — Assres H Woldemaryam
(74) *Attorney, Agent, or Firm* — Lerner, David, Littenberg, Krumholz & Mentlik, LLP

(57) ABSTRACT

The present invention relates to a fuselage nose door for sealing an opening in the hull of an aircraft. In order to make loading and unloading as efficient as possible, a door shell is proposed that is movably held between a closed setting and an open setting by a bearing device, wherein the door shell can be pivoted and shifted in relation to the bearing device. The invention also relates to an aircraft with such fuselage nose door. In addition, the invention also relates to a method for opening and closing an opening in the hull of an aircraft with a fuselage nose door, which has a door shell that is movably held by a bearing device between the closed setting and open setting, wherein the door shell is pivoted and shifted in relation to the bearing device in the opening and closing process.

16 Claims, 7 Drawing Sheets

U.S. PATENT DOCUMENTS

| | | | |
|---|---|---|---|
| 6,189,833 B1 * | 2/2001 | Ambrose et al. | 244/129.5 |
| 6,394,392 B1 | 5/2002 | Lafferty | |
| 6,406,249 B1 * | 6/2002 | McAdams et al. | 414/800 |
| 6,474,927 B1 * | 11/2002 | McAdams et al. | 414/340 |
| 6,796,528 B2 * | 9/2004 | Wood et al. | 244/121 |
| 6,845,945 B1 * | 1/2005 | Smith | 244/110 B |
| 7,261,257 B2 * | 8/2007 | Helou, Jr. | 244/137.1 |
| 7,290,736 B2 * | 11/2007 | Pahl | 244/129.5 |
| 7,896,291 B2 * | 3/2011 | Dehn et al. | 244/129.5 |
| 2002/0113532 A1 * | 8/2002 | Hornberger et al. | 312/323 |
| 2007/0025832 A1 * | 2/2007 | Rawdon et al. | 414/401 |
| 2009/0045288 A1 * | 2/2009 | Nakamura et al. | 244/129.5 |
| 2010/0127124 A1 * | 5/2010 | Yada et al. | 244/118.3 |
| 2011/0042517 A1 * | 2/2011 | Depeige | 244/129.5 |

* cited by examiner

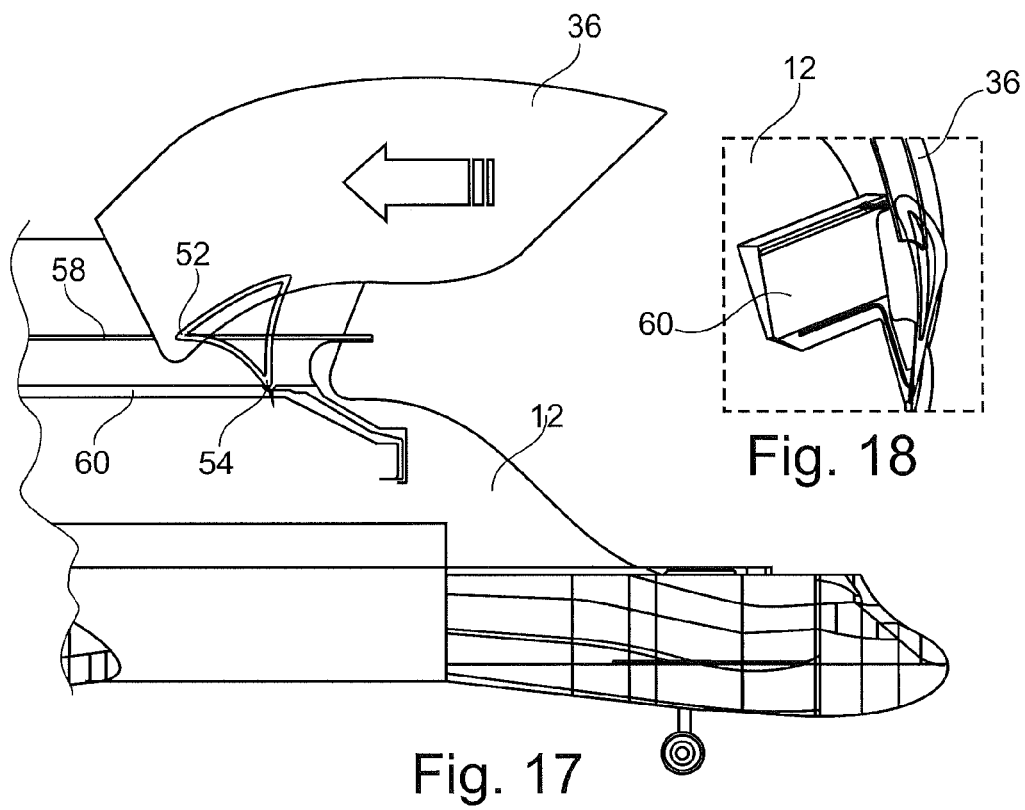
Fig. 17
Fig. 18
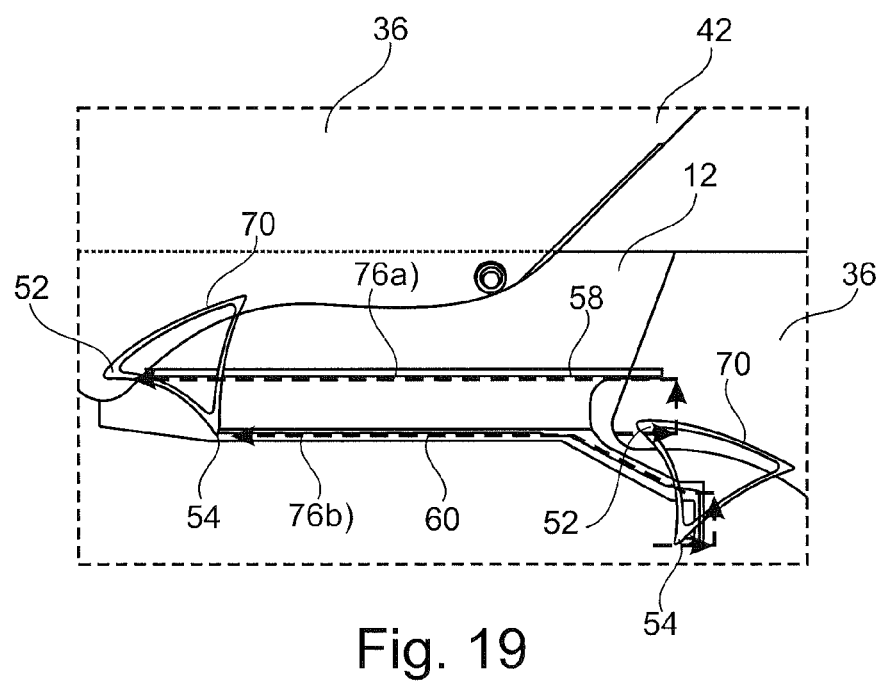
Fig. 19

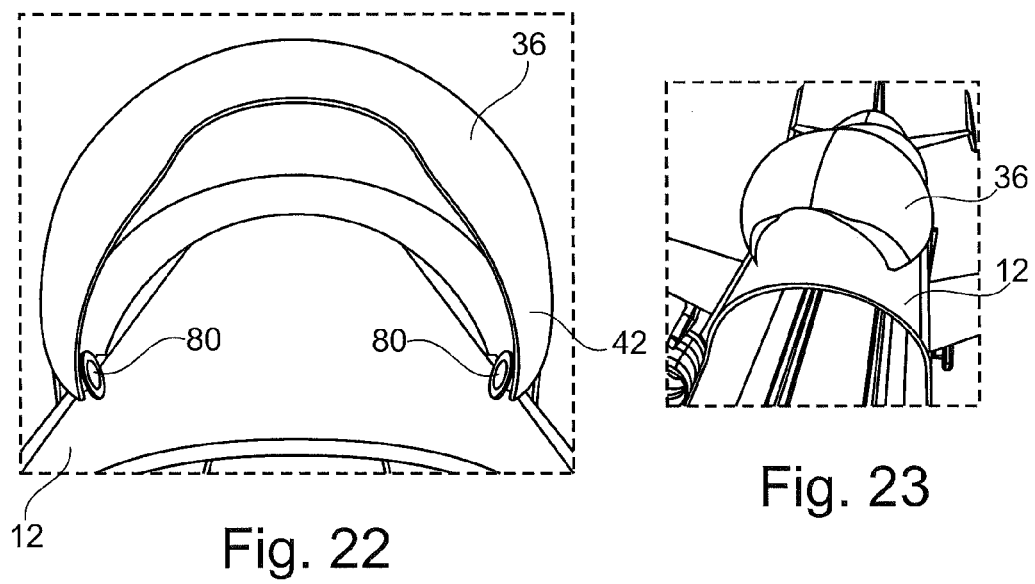
Fig. 22
Fig. 23
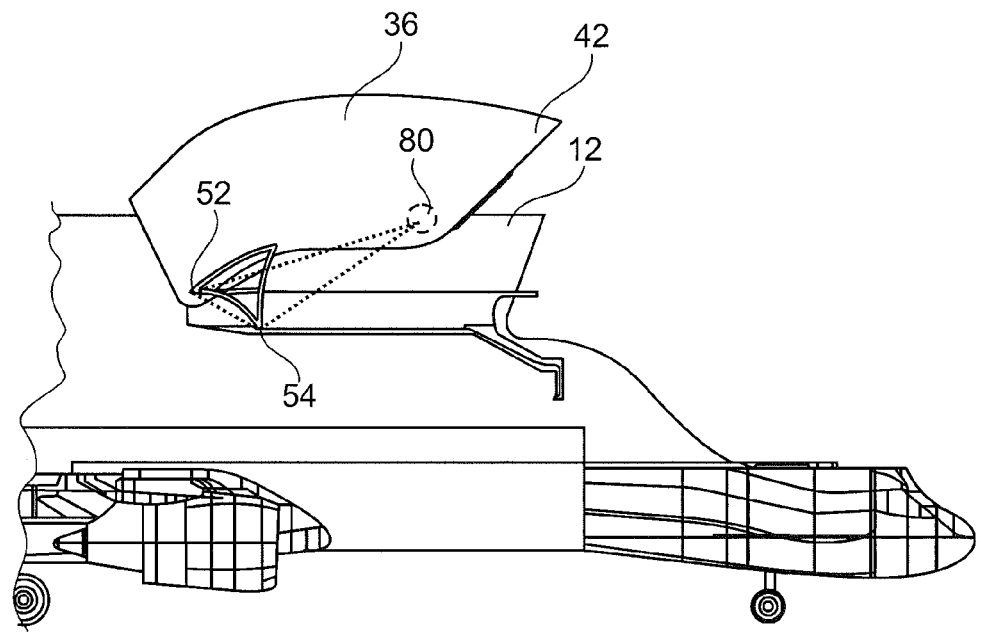
Fig. 24

FUSELAGE NOSE DOOR

CROSS-REFERENCE TO RELATED APPLICATIONS

This application claims the benefit of the filing date of U.S. Provisional Patent Application No. 61/167,266 filed Apr. 7, 2009, the disclosure of which application is hereby incorporated herein by reference.

FIELD OF THE INVENTION

The present invention relates to a fuselage nose door for sealing an opening in the hull of an aircraft, as well as to a method for opening and closing an opening in the hull of an aircraft with a fuselage nose door and an aircraft with a cargo area within the fuselage with a fuselage nose door that can be accessed from the front via the nose fuselage.

BACKGROUND OF THE INVENTION

Aircraft with front fuselage doors, so-called fuselage nose doors, are used in the area of air cargo transport, for example. In order to transport a wide variety of goods, various manufacturers offer aircraft, in particular airplanes, which are essentially designed for the transport of goods. To this end, the majority of the fuselage area is as a rule designed for accommodating goods. In addition to the weight of the cargo to be transported, primarily the stowage area required for awkward shaped or bulky goods as a function of the dimensions represents a central variable. Known for this purpose, for example, are special transport airplanes, so-called freighters, e.g., the Beluga model from Airbus. For example, such a freighter can transport bulky goods, such as fuselage sections of an airplane, via airfreight from a manufacturing site to an assembly site. For purposes of accommodating these goods, wherein pre-assembled components other than fuselage sections, such as airfoils, are also transported, the fuselage of the freighter is provided with an especially large diameter. Largely dimensioned nose flaps or tailgates are known for making the most efficient possible use of the available clear cargo space. Known from DE 196 42 196 C1 is a freighter in which the tail area is provided with a swiveling loading ramp as part of a two-part gate for closing the loading and unloading opening.

BRIEF SUMMARY OF THE INVENTION

Given openings in the nose area, the opening element, e.g., the nose door, can be made larger, since it cannot conflict with other components standing away from the fuselage, like the rear elevator and rudder units in the case of a tailgate. For this reason, various types of airplanes from different manufacturers are known, in which the nose area, i.e., the area of the front fuselage structure, accommodate airplane fuselage doors. In these, the door to be opened, i.e., the flap to be opened, is moved by swiveling it around a horizontal or vertical rotational axis. In other words, the door is opened either to the side or to the top. One disadvantage to these doors is that the bearings must be able to absorb strong forces due to the large door dimensions so as to relay the latter to the fuselage structure. It has also been shown that the opened doors must often be closed again at higher wind velocities, since they represent a large working or load acting surface for wind. The susceptibility to wind can end up delaying loading and unloading operations depending on the weather, and hence lead to an unnecessary layover of the aircraft on the ground. In addition to the accompanying economic limitations, this also translates into uncertainty in scheduling cargo transports, which in turn can have negative ramifications for the entire cargo logistics chain.

Therefore, there exists a need to provide a fuselage nose door that enables a most efficient possible loading and unloading of bulky goods.

According to the invention, this objective is achieved by a fuselage nose door of the kind mentioned at the outset, with a door shell moveably held by a bearing device between a closed and open position, in which the door shell can pivot and slide relative to the bearing device.

One advantage to this fuselage nose door structure lies in the fact that the mechanism of movement comprising of a combination of translation and rotation enables the opening of as large an opening area as possible on the one hand, and permits a more efficient cargo offloading in the open state. The combination of movement types also makes it possible to move the door shell into an open position in such a way that it can be exposed to strong wind forces in the open position, i.e., is less dependent on weather conditions.

The airplane preferably involves a freighter used predominantly or even exclusively for transporting goods. The fuselage nose door is also designated as the cargo door, since it is used to load and unload cargo goods on airplanes.

In a preferred embodiment, the door shell has a load-bearing structure, which is provided with an exterior skin.

This makes it possible to configure the door shell both for a type of burden during flight as well as a type of burden with open door shell, since the structure can be adjusted accordingly to the progression of forces involved in the two different types of burdens.

The exterior skin preferably has the same properties as the remaining exterior skin of the aircraft.

In a preferred embodiment, the door shell contour is adjusted to the adjacent contour of the exterior skin of the aircraft, so as to avoid aerodynamic impairments due to the fuselage nose door.

In another preferred embodiment, the door shell can pivot transverse to the longitudinal axis of the aircraft, and can slide in the transverse and longitudinal direction of the aircraft.

As a result, a fuselage nose door can be opened over a large area, and the door shell can at the same time be moved as completely as possible from the area of the opening, so as to provide as undisturbed or unimpaired an opening as possible, thereby enabling an efficient loading and unloading, during which the opened door shell is not in the way during the loading and unloading process.

In a preferred embodiment, the door shell can initially slide up while being moved from the closed to open setting, after which the top can pivot upward and simultaneously slide to the back.

It is noted that, within the context of the present invention, location and direction indications like up/down and front/back relate to an aircraft in the normal position, i.e., to an aircraft on the ground, in relation to the flight direction, unless otherwise specified.

Based on the described combination of movements comprising of vertical sliding followed by pivoting and simultaneous sliding, it is possible to open a large area of the fuselage in the nose area of the aircraft, and move the opened door shell to its open position, so that the door shell no longer impedes the opening. Another advantage is that the door shell offers a significantly lower wind resistance by comparison to a door shell that merely pivots up, despite its large dimensions, i.e., the possible working or load acting surface for wind and wind gusts in the area of an airfield is clearly reduced in the loading and unloading process with the nose door open. In other words, the fuselage nose door according to the invention permits loading and unloading that is more independent of the weather.

In another embodiment, the bearing device has two lateral bearings, which can each slide in a guide arrangement, wherein the door shell can be pivoted around the bearings.

The lateral bearings make it possible to safely introduce force in the guiding direction. At the same time, the bearings can be designed to pivot in such a way as to achieve a combination of translation and rotation movements with the simplest mechanism possible. The lateral bearings can also be integrated in the area of the lateral wall sections of the fuselage, so that the vertically acting forces resulting from the weight of the door shells can be better dissipated than would be the case when arranging the bearings at the vertex or frontal region of the fuselage.

In another preferred embodiment, each bearing has a first and second holding point.

The two holding points on either side make it possible to reliably hold the door shell, since the first and second holding point can be used to also absorb torque forces as a function of the distance between the two holding points.

In a preferred embodiment, the first and second holding points are guided in at least one guiding rail.

The guiding rail enables a simple and reliable removal of the weight and wind load during the opening process.

In a preferred embodiment, the at least one guiding rail is a crank, which forms a cam mechanism to shift and pivot the door shell as it moves between the open and closed position.

The cam mechanism enables a simple and efficient structural design of the movement mechanism required for the combination of translation and rotation.

In an alternative embodiment, the guiding rail is straight, and the bearings can shift linearly, wherein additional positioning means are provided with which the door shell can be pivoted around the bearing.

In another preferred embodiment, the first and second holding points are each immovably arranged on the door shell in relation to each other.

This reduces the number of actuators required for the movement, and avoids a complex controller.

In a preferred embodiment, the door shell has at least two lateral load introduction devices, on which the respective first holding point and second holding point are situated.

The load introduction devices here assume the task of introducing the forces from the area of the door shell in holding points.

In a preferred embodiment, the bearing device is arranged offset relative to the center of gravity of the door shell in the longitudinal direction of the airplane.

This makes it possible to keep the movement mechanism out of the area of the opening to the greatest possible extent, so that as undisturbed an opening geometry as possible can be provided. As a result, the movement mechanism can engage on the side of the door shell, i.e., on the rear end of the door shell, so that the front area, and hence the opening geometry, is not impaired by the movement mechanism.

In a preferred embodiment, the first holding point and the second holding point are vertically offset relative to each other.

This ensures that the forces necessary for swinging open can be transferred to the door shell as simply as possible.

In a preferred embodiment, the load introduction device comprises a frame that forms a load introduction triangle, which at two corner points is joined with the load-bearing structure of the door shell, and at the third corner point projects from the door shell in the direction of the door shell surface, wherein the upper holding point is arranged on one of the two corner points joined with the load-bearing structure, and the lower holding point is arranged on the corner point projecting from the door shell.

The triangular structure of the load introduction device makes it possible to introduce a torque for opening the door shell, wherein the torque can be transferred to the door shell by correspondingly exposing the two holding points to a force via the load introduction triangle.

In another preferred embodiment, the first holding point is guided into a first guiding rail and the second holding point is guided in a second guiding rail on both sides, wherein the first guiding rail and the second guiding rail are vertically offset relative to each other, and progress at a varying distance from each other.

For example, when the first and second holding points are immovably arranged in relation to each other, the varying distance between the guiding rails while guiding the first holding point in the first guiding rail inevitably also causes a guiding of the second holding point that depends on the distance of the guiding rails. In other words, the changing distance between the guiding rails leads to a change in the position of the two holding points in the room, or relative to the guiding rails.

The upper guiding rail preferably runs parallel to the roof ridge of the fuselage, and the lower guiding rail runs viewed from the front to back in the front portion toward the upper guiding rail, inclined and toward the top, and then passes over into an area in which it runs parallel to the upper guiding rail.

As an alternative, the upper guiding rail can also run parallel to the fuselage axis. Since use is generally made of fuselage designs in which the fuselage structure exhibits a constant cross section over at least a large area, and hence a constant outer contour, the nose door or door shell can slide more or less horizontally in the shifting process, so that only the frictional forces of the bearing need be surmounted while shifting. This avoids an additional lifting of the door shell during this movement phase, for example, as occurs given a continuously inclined guiding rail.

When moving the upper holding point in the upper guiding rail, the lower holding point in the lower guiding rail is upwardly deflected at an inclination in such a way as to upwardly pivot the door shell on its free front edge.

The upward pivoting motion lifts the door shell with its top by such a distance that it can freely slide over the contour of the fuselage.

In a preferred embodiment, a guiding rail frame is provided per side, in which the first and second guiding rails are formed.

The guiding rails are preferably designed integrally with the guiding rail frames.

The guiding rail frame ensures a reliable guiding of the two holding points relative to each other, and enables a uniform load introduction in the wall or fuselage structure of the aircraft.

In an alternative embodiment, the first and second holding points are guided in a shared guiding rail, wherein the guiding rail changes its direction in the process in such a way that the door shell executes a translation combined with a rotation during movement between the closed position and open position. For example, the guiding rail initially moves upwardly straight ahead over one portion, so as to lift the door shell over the fuselage profile, which is followed by an angling or curving that pivots the door shell relative to the fuselage, so that the front edge of the door shell can traverse the fuselage profile. The guiding rail then continues horizontally again, so that the door shell can be shifted over the fuselage in such a way as to move out of the opening to enable as unimpeded an access to the cargo hold opening as possible.

In another embodiment, the distance between the first and second holding point can be varied, and the first holding point is guided in a first guiding rail, and the second holding point in a second guiding rail, wherein the first and second guiding rails run at the same distance relative to each other.

In this embodiment, the torque required for pivoting is applied by changing the distances between the two holding points relative to each other.

Another preferred embodiment provides first actuating means with which the bearings can be vertically shifted, and second actuating means with which the bearings can be horizontally shifted.

In this way, the design of the first and second actuating means can be optimized for the respective application, i.e., the forces to be transmitted.

In a preferred embodiment, the upper holding points can be relayed to the upper guiding rails with the first actuating means, or can be engaged with the upper guiding rails when in a vertically shifted, i.e., lifted position.

In a preferred embodiment, the first actuating means act on the upper holding point when shifted, wherein the lower guiding rails have a vertically running portion with a length corresponding to the respective measure of vertical shifting, and wherein the lower holding points each are guided in the lower guiding rail, which serves as a counter-bearing during vertical shifting to support the door shell.

Therefore, the force required for lifting and lowering is only introduced at one of the two holding points per side, while the second holding point is guided for stability purposes. For example, if the bearing device is offset in the longitudinal direction of the aircraft relative to the center of gravity of the door shell, the guiding rail acting as a counter-bearing reduces the force to be generated to a vertically acting force, i.e., the torque resulting from the door shell is not compensated by the first actuating means. The latter need only provide the counter-component for support purposes during the lifting process, but this can be achieved, for example, by providing the appropriate guidance or stop for the upper holding point in the course of lifting.

In a preferred embodiment, the first actuating means have one lifting device per bearing. To this end, for example, a hoisting rocker can be provided, in which an actuator acts on a lever. For example, the actuator can be designed as a pneumatic or electromagnetic actuating cylinder, or as a motor-driven threaded rod actuator.

In a preferred embodiment, the second actuating means have a catch per bearing that can be coupled to a driving means.

The bearings guided in the guiding device here serve to divert dead weight and any wind forces acting on the opened door shell, while the second actuating means are provided only for the essentially horizontal translation of the bearings.

In a preferred embodiment, the catch is a carriage accommodated in the upper guiding rail.

This reduces the required construction area to a minimum.

Alternatively or additionally, the lower guiding rail can also accommodate a catch. If catches are incorporated in both the upper and lower guiding rail, additional means are provided with which the two catches per side can be coordinated.

In a preferred embodiment, the driving means is a rope or chain driven by a motor.

This makes it possible to arrange the motor at a remote installation site, and make the bearing device as small as possible in the area of the opening and clear cross section.

In a preferred embodiment, the driving means is attached at the ends, and forms an endless element that runs over at least two deflection rollers.

This makes it possible to transmit two oppositely acting forces to the catch.

For example, the motor can be an electric, hydraulic or pneumatic motor.

In a preferred embodiment, the interior side of the door shell is provided with a supporting device for supporting the door shell on the exterior side of the fuselage of the aircraft in the open position.

As a result, the wind forces acting on the door shell in the open position can be more effectively removed, so that the bearing device can be made smaller relative to the opening position. In addition, the bearing device is also relieved of stress by virtue of the fact that the dead weight of the door shell is also dissipated by the supporting device during the loading and unloading process.

In a preferred embodiment, the supporting device has two support rollers arranged opposite each other on the lower lateral edges of the door shell.

The support rollers preferably lie laterally under the roof ridgeline of the fuselage on the exterior side, and thereby form an additional support for wind forces acting laterally on the door shell.

For example, the support rollers are made of rubber, and dimensioned in such a way that the expected forces, e.g., the bearing forces arising from the dead weight and wind force, cannot lead to a deformation of the exterior side of the fuselage.

So as not to make the support rollers unnecessarily large, additional reinforcing elements can also be inserted under the exterior side of the fuselage, i.e., under the outer skin, with which the supporting force from the support rollers is diverted to the fuselage structure.

In another preferred embodiment, the closed position has a latching setting, and latching elements are provided on the door shell, so as to engage with latching counter-pieces in the aircraft fuselage in the latching setting, wherein the door shell can be shifted to the front in the longitudinal direction of the aircraft for unlatching purposes, before the door shell can be shifted upward.

This makes it easy to achieve a very reliable latching of the door shell that precludes opening during flight operations.

A preferred embodiment provides a third actuating means with which the door shell can be horizontally moved between the latched and unlatched position.

In a preferred embodiment, the door shell can be engaged with the first actuating means while moving from the latched position to the unlatched position.

This ensures that the first actuating means can only act on the door shell if the latter is in the unlatched position.

The invention also relates to an aircraft with a fuselage structure and two laterally adjoining wings, wherein the fuselage has a load-bearing structure and a cargo area accessible from the front via the nose fuselage inside the fuselage. According to the invention, the aircraft has a fuselage nose door based on one of the embodiments described above.

This provides an aircraft in which the fuselage nose door can have the same clear dimensions as the clear opening width of the fuselage in the area of the cargo hold. As a result, the cargo hold can be utilized as efficiently as possible. The fuselage nose door makes it possible to load the aircraft even given large gusts and high winds, which in addition to economic advantages also translates into a greater planning safety in the area of transport logistics.

In a preferred embodiment, the fuselage nose door can be moved in the open position in such a way that at least a portion of the cargo hold can be loaded from above.

As a result, various loading and unloading methods can be made available, for example loading and unloading by means of cranes.

The portion of the loading area that can be loaded from above preferably has a length of at least 20 feet in the longitudinal direction of the aircraft.

For example, this ability to freely load the cargo area from above makes it possible to place standard containers or even fuselage segments of airplanes onto the loading area by means of a crane. This makes loading and unloading such large components as easy and efficient, and hence as time-saving, a process as possible.

In a preferred embodiment, the bearing device is integrated into the fuselage structure in such a way as to dissipate the loads from the door shell via the bearing device and into the load-bearing structure of the fuselage structure in the area of the lateral wall of the fuselage.

An advantage of the aircraft according to the invention is that the tangential load introduction, as it were, can be better dissipated from a static standpoint in the area of the lateral wall of the fuselage structure than in a case where a weight is introduced into the structure the area of the roof ridge line of the fuselage. This is because in the latter case, only the thickness of the wall structure would be available as the so-called structurally statically effective height, while a significantly greater statically effective height can be made available during tangential introduction in the wall structure, specifically in the direction of the wall.

In a preferred embodiment, the bearing device is integrated inside the exterior hull of the fuselage, and can be sealed in the closed position by cover elements for flight operations.

This enables the provision of an aircraft with as unimpaired an exterior skin as possible, so that providing a fuselage nose door does not result in aerodynamic, and hence economic and ecological, disadvantages.

The present invention also relates to a method for opening and closing an opening in the hull of an aircraft with a fuselage nose door, wherein the fuselage nose door has a door shell that is movably held between a closed setting and open setting by means of a bearing device.

The invention provides that the door shell is pivoted and shifted in relation to the bearing device in the opening and closing process.

In a preferred embodiment of the method, the door shell is pivoted transverse to the longitudinal axis of the aircraft, and shifted in the transverse and longitudinal direction of the aircraft.

A further preferred embodiment of the method provides for the following steps:
Upwardly shifting the door shell in such a way that the rear profile of the door shell can be moved over the fuselage profile of the aircraft, and
Shifting the door shell toward the back over the fuselage of the aircraft, and simultaneously pivoting the door shell transverse to the longitudinal axis of the aircraft, wherein the door shell is upwardly pivoted in such a way that the front edge of the door shell can be moved over the fuselage profile of the aircraft.

In a preferred embodiment, the door shell is shifted further back after pivoted in the longitudinal direction of the aircraft. This opens up the largest possible area of the opening, without the front end of the door shell disruptively projecting into the opening area The upward movement takes place to ensure the free clearance of the door over the fuselage. The rearward movement, during which the door pivots open and simultaneously shifts toward the back, releases the opening, so that the loading area can be loaded from above, preferably over a length of at least 20 feet.

This also makes the method suitable for loading and unloading very large goods, such as standard containers or segments and other pre-assembled components of aircraft, which are to be transported from a manufacturing site to another assembly site.

In a preferred embodiment, the door shell is supported in the open position on the fuselage of the aircraft by means of a supporting device, for example by two support rollers, for example arranged opposite each other on the lower, lateral edges of the door shell.

However, the supporting device can already become active prior to the open position, specifically when the supporting device is located above the fuselage, i.e., in the process of opening before the actual open position is reached. To this end, the supporting device is situated at the lower edge of the door shell spaced apart from the front lower top of the door shell relative to the door shell in a closed state.

In a preferred embodiment, the door shell is pivoted around two lateral bearings, which are each moved in a guiding direction of the bearing device.

The guiding device here assumes the function of supporting the bearings relative to both the dead weight of the door shell and the wind force, and of moving the bearings along the guiding device.

Each bearing preferably has a first and second holding point, and the first and second holding points are guided in at least one guiding rail.

As a result, it is easy to apply a torque to the door shell, for example to pivot open the door shell.

In a preferred embodiment, the first and second holding points are each arranged on the door shell immovably relative to each other, and the first holding point is guided in the first guiding rail, and the second holding point is guided in the second guiding rail on each side, wherein the first guiding rail and the second guiding rail are vertically offset relative to each other, and progress at a varying distance from each other.

The upper guiding rail preferably runs parallel to the roof ridge of the fuselage or parallel to the fuselage axis, and the lower guiding rail runs viewed from the front to back in the front portion toward the upper guiding rail, inclined and toward the top, and then passes over into an area in which it runs parallel to the upper guiding rail, so that, when the upper holding point is moved in the upper guiding rail, the lower holding point in the lower guiding rail is upwardly deflected at an inclination in such a way as to upwardly pivot the door shell on its free front edge.

This ensures that the door element, i.e., the door shell, is reliably held and guided during the entire opening process.

In a preferred embodiment, the bearing is vertically shifted by first actuating means, and horizontally shifted by second actuating means.

As a consequence, the two actuating means can be designed to reflect their respective types of load condition.

In a preferred embodiment, the upper holding points are relayed to the upper guiding rails with the first actuating means, or engaged with the upper guiding rails when via lifting.

As a consequence, the upper guiding rails are reduced to a minimum, since the bearing is already guided during the lifting process as effected by the first actuating means, and no additional guiding is required for this area via the upper guiding rail. Only after lifting is complete can the upper holding point be shifted in the upper guiding rail.

In a preferred embodiment, the upper holding points are vertically shifted by the first actuating means, wherein the lower guiding rails have a vertically running area with a length corresponding to the respective measure of vertical shifting, so that the lower holding points are guided in the lower guiding rail, which serves as a counter-bearing during vertical shifting, thereby supporting the door shells. For example, support is provided by arranging the bearing device offset relative to the center of gravity of the door shell in the longitudinal direction of the aircraft.

As a result of providing the lower guiding rail as the counter-bearing, the first actuating means has to apply a vertically active lifting force, wherein the upper holding point is simultaneously fixed in the horizontal direction. The lower counter-bearing eliminates the need to apply a torque.

In a preferred embodiment, the door shell is shifted toward the front prior to vertical shifting in the longitudinal direction of the aircraft, during which the door shell is unlatched.

Therefore, the door shell is initially unlatched prior to the actual opening process. Since predominately drag forces acting on the door shell from the front arise during flight operation, shifting according to the invention in the longitudinal direction toward the front for purposes of opening prevents the door shell from inadvertently opening during flight operation.

In a preferred embodiment, latching elements of the fuselage nose door, for example twist locks, are disengaged from the latching counter-pieces in the unlatching process to a point where the door shell can be moved freely upward.

The twist locks are preferably immovably connected with the movable door shell or the latching counter-pieces are rigidly joined with the immovable aircraft fuselage, so as to preclude opening during flight operations, since the drag presses the door shell in the latching position.

The latching elements and latching counter-pieces are preferably self-centering, so that the precision required for the reliable sealing of the exterior hull in the area of the nose door and connection to the fixed exterior skin areas is established not by the movement mechanism, i.e., the bearing device itself, but by the latching device.

The nose flap according to the invention is also suitable for those airplane types in which the door shell also incorporates the area of the so-called airplane nose, i.e., the actual top of the aircraft. In other words, in these cases the fuselage nose door also comprises the front end of the aircraft.

It is noted that the preceding description of the invention and the following exemplary descriptions along with the claims are directed toward an aircraft, and aircraft within the context of the present invention is understood in particular to include airplanes and helicopters.

BRIEF DESCRIPTION OF THE DRAWINGS

The attached drawings will be used below to describe an exemplary embodiment of the invention in greater detail. Shown on:

FIG. 17 is a diagrammatic side view of the fuselage nose door in a position during the opening process;

FIG. 18 is an inclined view of the guiding device from FIGS. 13 and 14 viewed at an incline from the rear, with door shell lifted;

FIG. 19 is a diagrammatic side view of the fuselage nose door in the open setting, showing the movements of the bearings in the bearing device in the lateral guiding device during the opening process;

FIG. 22 is a diagrammatic view (section) of the fuselage nose door from the front in the open setting;

FIG. 23 is a diagrammatic inclined view (section) of the fuselage nose door from FIG. 22; and on FIG. 24 is a diagrammatic side view of the fuselage nose door in the open setting with load transmission triangle sketched in.

DETAILED DESCRIPTION

Figure 1:
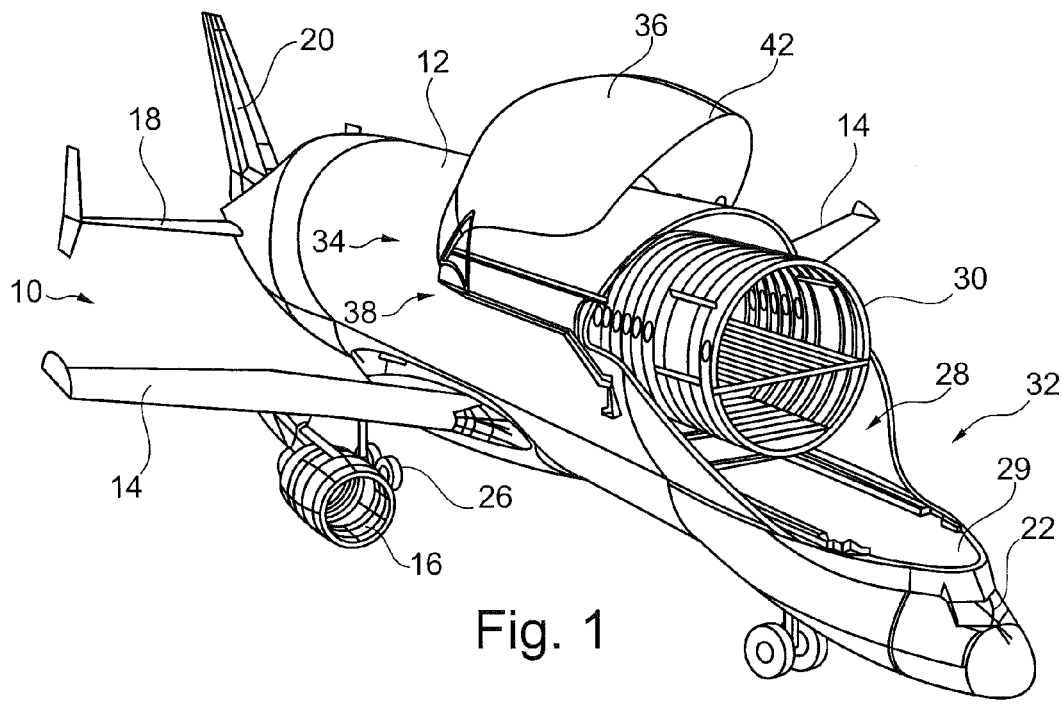
FIG. 1 is a diagrammatic inclined view of an aircraft according to the invention with open fuselage nose door.

FIG. 1 shows an aircraft 10 with a fuselage area 12 and two laterally adjoining wings 14, which are provided with engines 16. The rear end of the fuselage area 12, i.e., the left end of the fuselage area on FIG. 1, is provided with an elevator unit 18 and a rudder unit 20. The front end of the fuselage area 12 is provided with a cockpit 22. The depicted aircraft 10 is a freighter designed for the transport of bulky goods. The transport airplane or freighter is shown standing on the ground, as denoted on FIG. 1 with a front landing gear 24 and a middle landing gear 26 provided in the area of the wing attachment. The fuselage area has a cargo hold 28 with a loading area 29, wherein FIG. 1 depicts a fuselage segment 30 of an aircraft still to be assembled, which is to be transported in the cargo hold 28. An opening 32 is provided in the nose area of the aircraft, i.e., in the area of the front end of the airplane, for the loading and unloading of the cargo hold 28. This opening 32 in the nose fuselage is provided with a fuselage nose door 34, which exhibits a door shell 36 that is movably held by means of a bearing device 38 between a closed setting 40 and an opening setting 42 (see FIG. 5).

Figure 2:
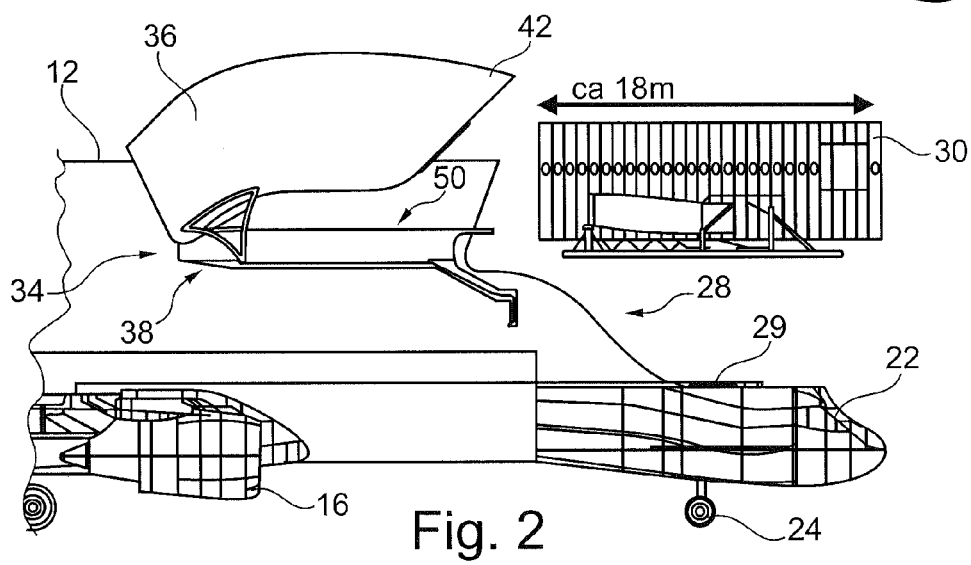
FIG. 2 is a diagrammatic side view of the aircraft from FIG. 1.
Figure 3:
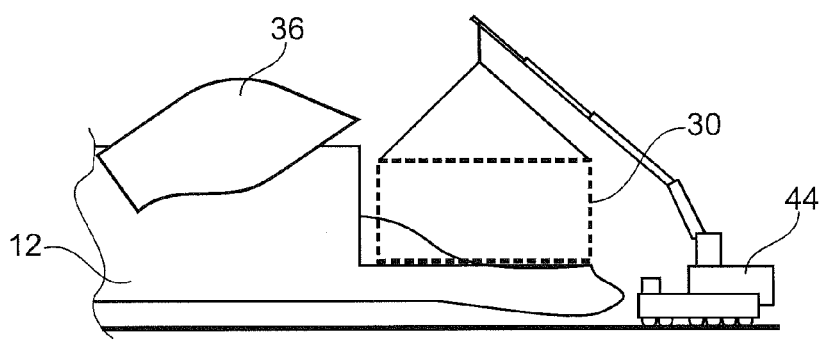
FIG. 3 is a diagrammatic view of an optional loading process involving a crane device.

FIG. 2 shows the door shell 36 in the open setting 42. As evident, the door shell 36 in this open setting is arranged in such a way that at least one portion of the cargo hold 28 can be loaded from above. To this end, for example, it is provided that a portion of the loading area 29 can be loaded from above in the longitudinal direction of the aircraft over a length of approx. 18 m. In this regard, FIG. 3 indicates that the fuselage segment 30 depicted on FIG. 1 and FIG. 2 can be placed from above onto the loading area by means of a crane device 44.

Figure 4:
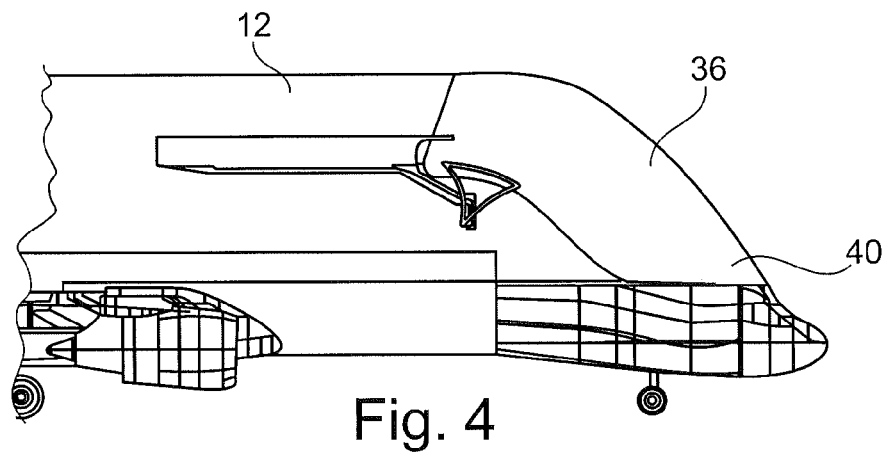
FIG. 4 is a diagrammatic side view of the aircraft from FIG. 1 with the fuselage nose door in the closed setting.
Figure 5:
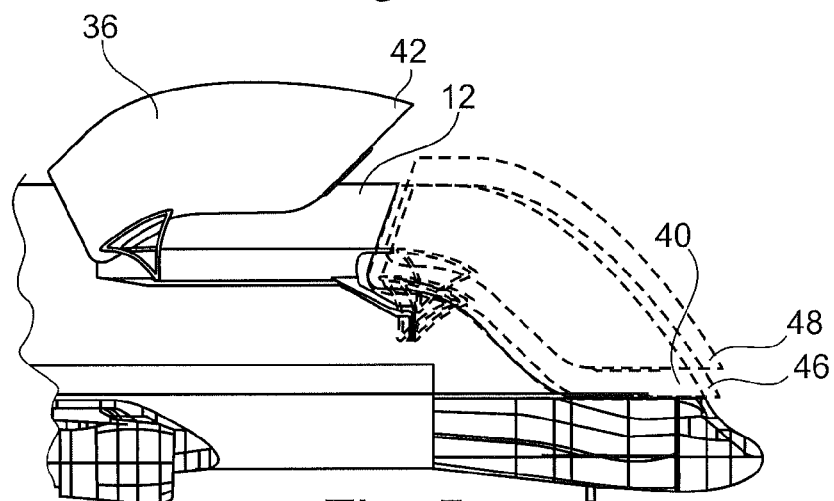
FIG. 5 is a diagrammatic side view of the aircraft from FIG. 1 with the fuselage nose door in the latched position of the closed setting, unlatched position, lifted setting, and open setting.

FIG. 4 shows the fuselage nose door in the closed setting 40. Shown on FIG. 5 is the door shell 36 in the already mentioned closed setting 40, and in the open setting 42 depicted on FIG. 1 and FIG. 2, as well as in an unlatched position 46 and a lifted setting 48.

Figure 6:
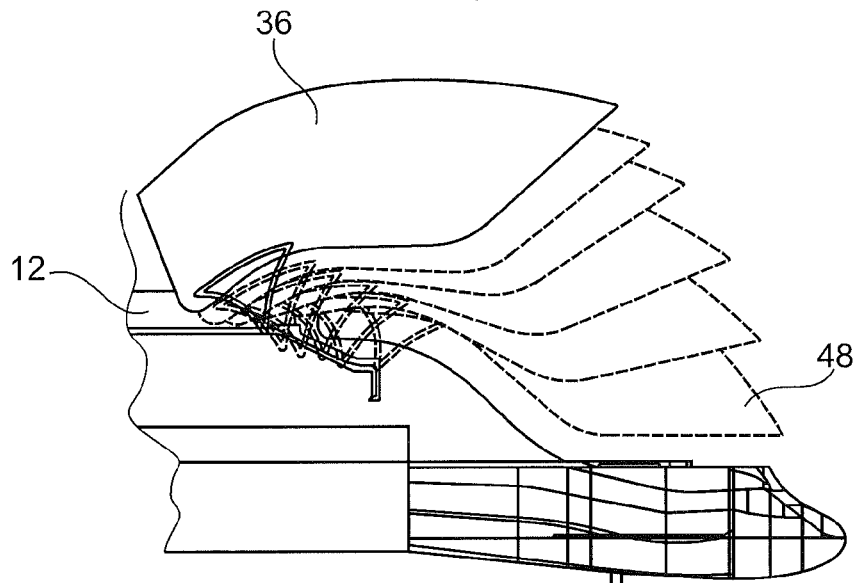
FIG. 6 is a diagrammatic side view of the aircraft with implied motion sequence (cutout) of the fuselage nose door.

According to the invention, it is provided that the door shell 36 is pivoted and shifted while being opened and closed in relation to the bearing device 38. To this end, the exemplary embodiment shown (see FIG. 5) provides that the door shell 36 is shifted toward the front from a latched position in the closed setting 40 into the unlatched position 46. The door shell 36 is subsequently shifted vertically upward, i.e., vertically, into the lifted setting 48, so that the rear profile of the door shell 36 can be moved over the profile of the fuselage 12 of the aircraft 10. As depicted sectionally on FIG. 6, this is followed by a shifting of the door shell toward the back over the fuselage 12 of the aircraft 10, and a simultaneous pivoting of the door shell 36 transverse to the longitudinal axis of the aircraft 10, wherein the door shell 36 is upwardly pivoted in such a way that the front edge of the door shell 36, i.e., the right tip of the door shell 36 on FIG. 5, can be moved over the fuselage profile of the aircraft 10. FIG. 6 here presents individual segments that show individual increments of motion, wherein the motion of course takes place continuously, and not incrementally. The incremental representation serves only to provide a better understanding of the sequence of movements performed by the door shell 36.

Figure 7:
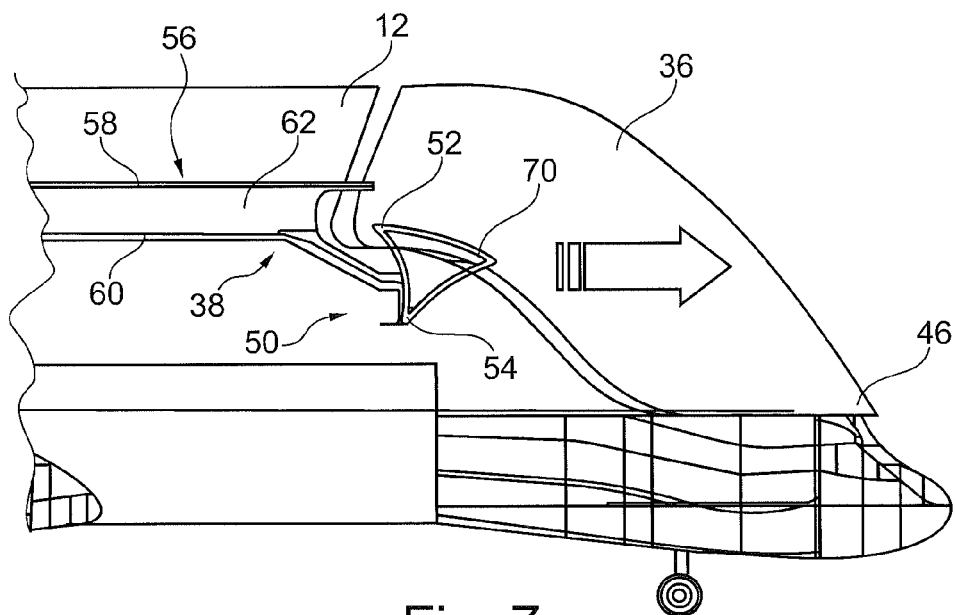
FIG. 7 is a diagrammatic side view of the fuselage nose door in the unlatched position of the closed setting.

FIG. 7 shows the door shell 36 in the unlatched position, i.e., in the position in which the door shell is shifted a bit toward the front.

With respect to the sequence of movements, it is provided that the bearing device 38 has two lateral bearings 50, of which the right side viewed in the flight direction is depicted on FIG. 7. Each bearing 50 has a first holding point and a second holding point 54, wherein the two holding points 52, 54 are unmoving in relation to each other. To enable the door shell 36 to pivot and shift, the lateral bearings 50 can each shift in a guiding device 56. For this purpose, the guiding device 56 has a first guiding rail 58, in which the first holding point 52 is guided. In addition, the guiding device 56 has a second guiding rail 60 in which the second holding point 54 is guided. The first guiding rail 58 and the second guiding rail 60 are vertically offset relative to each other, and are spaced varyingly apart over their progression. In order to enable a greater stability and more uniform load introduction in the fuselage 12 of the aircraft 10, the first guiding rail 58 and second guiding rail 60 are formed in a guiding rail frame 62.

Figure 8:
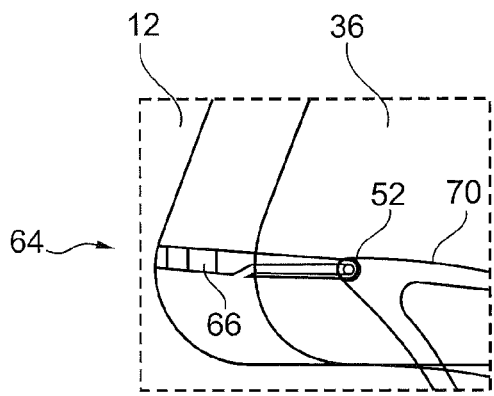
FIG. 8 is a detail of the bearing device of the door shell of the fuselage nose door from FIG. 7.
Figure 9:
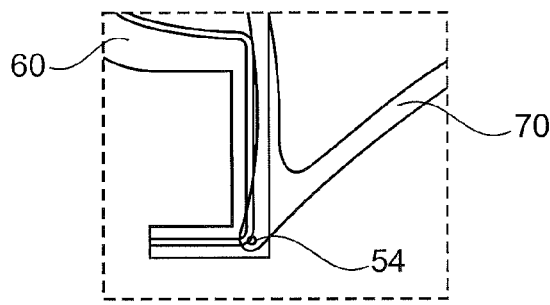
FIG. 9 is another detail of the bearing device.

FIG. 9 shows the second guiding rail 60, i.e., the lower guiding rail, at its front end. The lower holding point 54 here runs initially in a horizontally formed area, so that the door shell 36 can get from the latched position of the closed setting into the unlatched position 46. The second guiding rail 60 subsequently exhibits a vertical area, which permits a vertical lifting of the door shell 36. First actuating means 64 in the form of lifting devices per bearing are provided for lifting the door shell 36. FIG. 8 shows how a lifting rocker 66 is engaged with the upper holding point 52, so as to lift the door shell 36 by means of an actuator 68 (see FIG. 20d).

The first holding point 52, i.e., the upper holding point, along with the second holding point 54, i.e., the lower holding point, are arranged on a load introduction device in the form of a load introduction triangle 70, which is connected in the form of a frame at two corner points with the door shell 36 at its rear lower ends, and projects downward away from the door shell 36 with the third corner point in the direction of the door shell area. The upper holding point 52 is arranged at one of the two corner points connected with the door shell 36, and the lower holding point 54 is arranged on the corner point projecting from the door shell 36.

For example, the door shell 36 can here have a load-bearing structure, which is provided with an outer skin. The load introduction triangle 70 is improves the introduction of forces from the surface area of the door shell 36 into the two holding points 52, 54.

Figure 10:
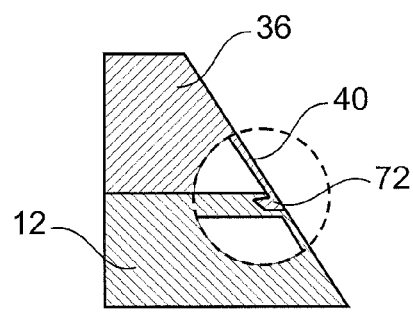
FIG. 10 is a diagrammatic view of the latching mechanism of the fuselage nose door according to the invention.
Figure 11:
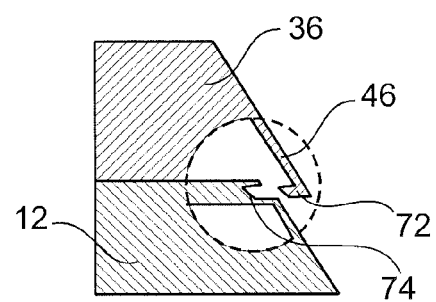
FIG. 11 is the fuselage nose door according to the invention from FIG. 10 in the unlatched position.

In order to reliably latch the door shell 36 in the closed setting 40, the front lower end of the door shell 36 is provided with latching elements 72 that engage latching counter-pieces 74 of the aircraft fuselage 12. The diagrammatic view on FIG. 10 and FIG. 11 denotes that the latching elements 72 and latching counter-pieces 74 form a self-finding latching device, so that the positioning of the door shell 36 in relation to the aircraft fuselage 12 required for the closed setting 40 takes place with sufficient accuracy using this latching device, i.e., the movement mechanism can be designed for the forces to be absorbed without having to provide very exacting accuracy, which is required to seal an opening with the least aerodynamic disruption possible.

Figure 15:
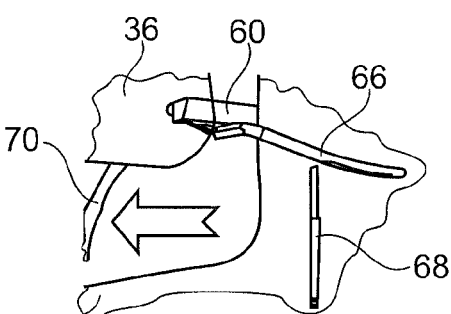
FIG. 15 is a section of the bearing device from FIG. 13 viewed from the interior side of the nose door.
Figure 14:
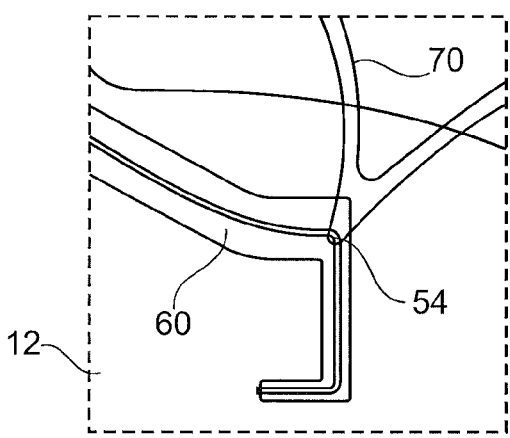
FIG. 14 is another detail of the bearing device.

After the door shell 36 has been horizontally shifted in the unlatched position, the door shell 36 is vertically lifted by the lifting rocker 66 (see FIG. 15), wherein the lower holding point 54 is guided in the vertical area of the lower guiding rail 60. The upper holding point 52 is lifted in such a way that it engages with the upper guiding rail 58. A second actuating means to be described in greater detail in conjunction with FIG. 21 is used to then horizontally shift the upper holding point 52 into the upper guiding rail 58.

Figure 12:
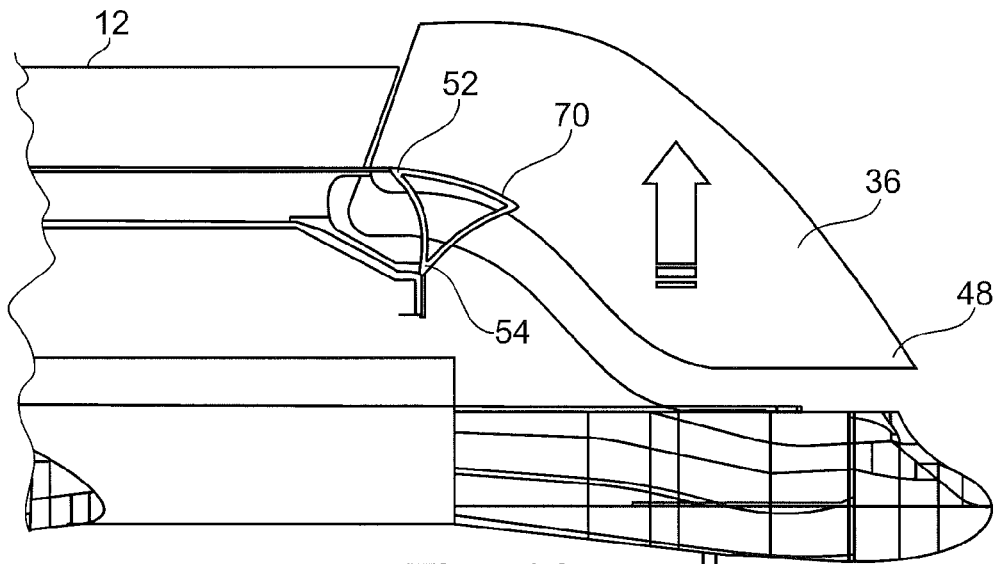
FIG. 12 is a diagrammatic side view of the fuselage nose door in the lifted setting.
Figure 13:
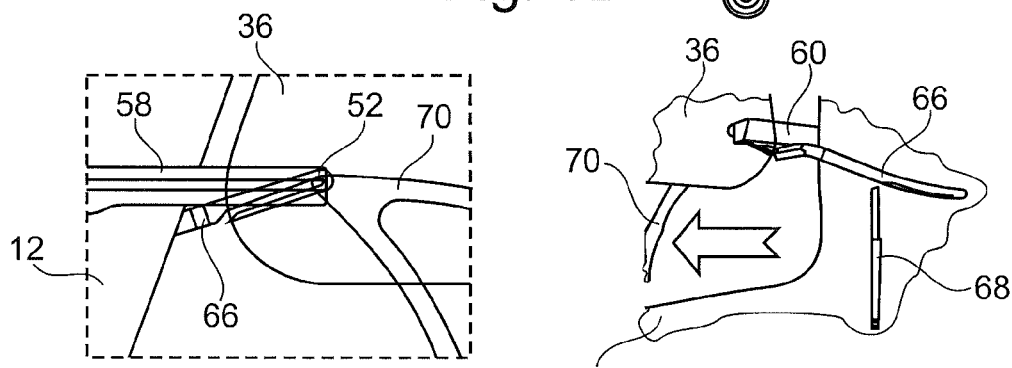
FIG. 13 is a detail of the bearing device of the fuselage nose door according to the invention from FIG. 12.
Figure 16:
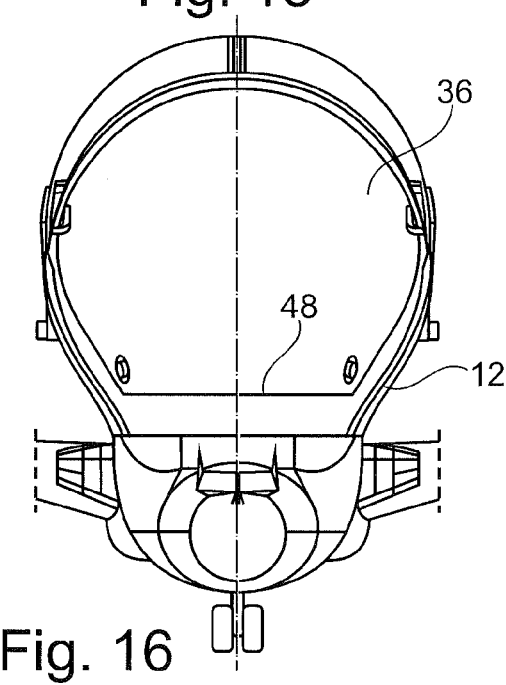
FIG. 16 is a diagrammatic side view of the freighter viewed from the front with the fuselage nose door in the lifted setting from FIG. 11.

FIG. 12 shows the door shell 36 in the lifted setting 48. As evident from FIG. 16, the door shell 36 is now lifted in such a way as to ensure a free clearance of the door shell 36 in the rear area over the fuselage 12.

As already mentioned, the process of hoisting into the lifted setting 48 is followed by a shifting of the upper holding point 52 into the upper guiding rail 58, toward the left on FIG. 17. Since the distance between the upper holding point 52 and the lower holding point 54 is invariable, the inclined, upwardly rising area of the lower guiding rail 60 causes a successive pivoting of the door shell 36 around the upper holding point 52 shifted along the guiding rail 60. The door shell 36 pivots because the lower holding point 54 is forcibly guided by the guiding rail 60 in such a way that it is no longer slightly offset under the upper holding point 52, but rather offset to a much greater extent, as evident from FIG. 17, as a function of the distance between the upper guiding rail 58 and the lower guiding rail 60. The opening or upward pivoting of the door shell 36 as it moves to the back, i.e., while moving to the left on FIG. 17, ensures that the front edge of the door shell 36, i.e., the right end of the door shell 36 on FIG. 17, is pivoted upwardly in such a way that the front edge of the door shell 36 can be moved over the profile of the fuselage 12 of the aircraft.

With reference to FIG. 2, it becomes evident that, after the front edge of the door shell 36 is pivoted up, the door shell 36 is shifted horizontally to the left in such a way as to release the opening for purposes of loading the cargo hold 29 from above.

FIG. 19 shows the load introduction triangle 70 with the upper holding point 52 and the lower holding point 54 in the closed setting 40 and latched position (in the right half on FIG. 19), and in the open setting 42 (in the left half on FIG. 19). As evident from the dashed line 76a, the upper holding point 52 is first shifted toward the front, and then shifted upward and to the left horizontally. The lower holding point 54 is here initially also shifted horizontally to the right and then vertically upward (see dashed line 76b). The upper holding point 54 is subsequently shifted upwardly at an inclination by the lower guiding rail 60 running upwardly to the left at an inclination, wherein the denoted rounded areas during the transition of the individual movement directions should be left out of account at this juncture, since they only help lessen the friction of the process, and are intended to prevent jerky movements by the door shell 36.

As already mentioned, since the two holding points 52, 54 are immovably arranged relative to each other, and are also arranged immovably relative to the door shell 36 by means of the load introduction triangle 70, the varying distance between the two guiding rails 58, 60 leads to a successive pivoting of the door shell 36 in the range of movement where the lower holding point 54 is located in the section of the lower guiding rail 60 running at an inclination.

As evident from FIG. 18, the guiding device 56 is integrated into the lateral wall of the fuselage structure 12 in the form of a guiding rail frame 62.

FIG. 20 individually shows the aircraft 10 (see FIG. 20a) and several of the already mentioned components of the fuselage nose door 34.

Figure 20A:
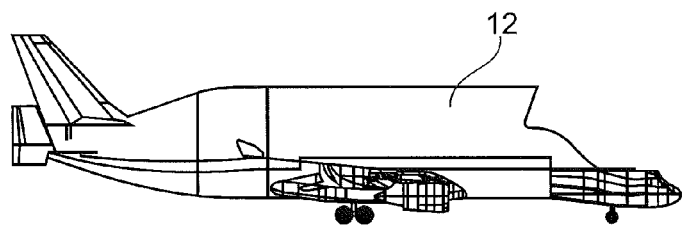
FIG. 20 are some of the components depicted on FIGS. 1 to 17.
Figure 20B:
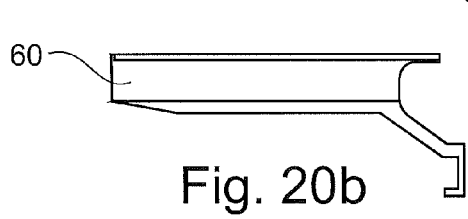

FIG. 20b shows the guiding rail frame 62, which enables a uniform load introduction, and hence distribution of forces, in the airplane fuselage 12.

Figure 20C:
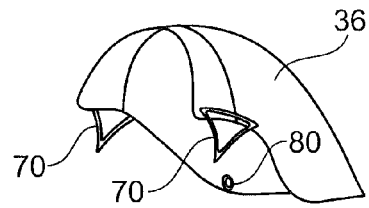

FIG. 20c shows the door shell 36 with the bilaterally arranged load introduction triangles 70. As also evident from FIG. 20c, two support rollers 80 are arranged on the interior side of the door shell 36 at the lower lateral edges, which will be described in greater detail in conjunction with FIGS. 22 to 24.

Figure 20D:
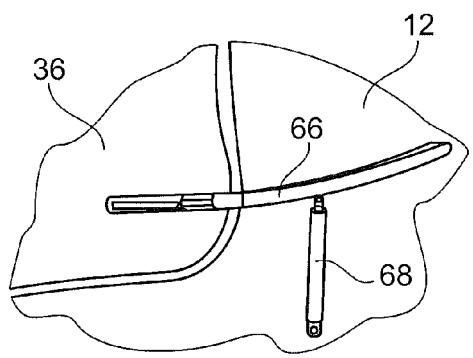

FIG. 20d shows the lever rod 66 in relation to the already mentioned actuator 68, which can be a pneumatic actuator, for example. For example, this makes it possible to generate the necessary oil pressure at a remote location of the aircraft where there is more installation space available.

Figure 20G:
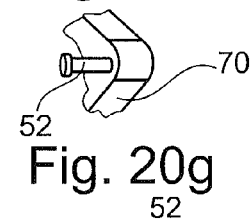
Figure 20E:
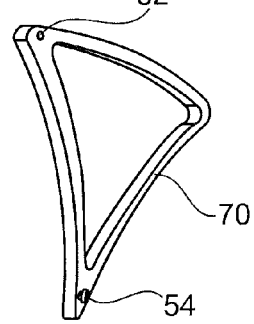
Figure 20F:
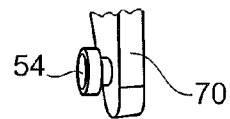

FIG. 20e shows the load introduction triangle 7 with the upper holding point 52 and the lower holding point 54, which are magnified on FIGS. 20f and 20g. The two holding points 52 and 54 are used on the one hand for purposes of load introduction of the dead weight of the door shell 36 and the wind forces acting on the door shell 36. In addition, the holding points are used to assure reliable guiding in the guiding rails with as little friction as possible.

Figure 21A:
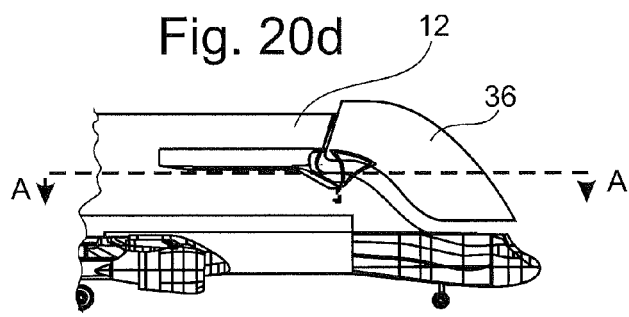
FIG. 21 is a diagrammatic view of an actuating means for the horizontal shifting of the bearings.
Figure 21B:
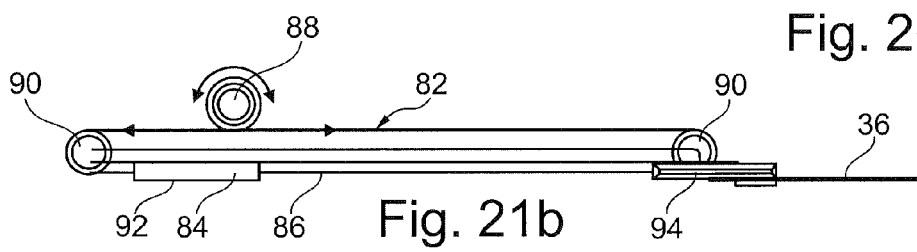

The horizontal movement of the upper holding point in the upper rails will be explained below based on FIG. 21. FIG. 21a shows a diagrammatic side view with a recorded sectional plane A-A. FIG. 21b shows a diagrammatic view of the movement mechanism in a horizontal section.

In order to horizontally shift the upper holding point 52 in the upper guiding rail 58, a catch 84 coupled to a driving means 86 is provided as the second actuating means 82. For example, the catch 84 is a carriage accommodated in the upper guiding rail 58, thereby taking up no additional or the least possible installation space. Provided as the driving means 86 is a rope, which is driven by a motor 88, wherein the rope is joined at the ends and forms a continuous element that runs over at least two deflection rollers 90.

The carriage 84 can be moved by the drive between a first, rear setting 92 and a second, front setting 94. The rear setting 92 corresponds to the open setting 42 of the door shell 36. The catch 84 is the front setting 94 at the front end of the upper guiding rail 58, so that the upper holding point 52 can engage with the catch 84, as a function of the position of the lifting device 64. In other words, the front setting 94 corresponds to the closed setting 40 or the forward shifted, unlatched position 46 or the lifted position 48.

FIG. 22 shows the fuselage nose door in the open setting 42 as viewed from the front. FIG. 23 shows the nose door as viewed at an inclination from above. In order to support the door shell 36 in this opening setting 42 on the exterior side of the fuselage 12 of the aircraft 10, the two already mentioned support rollers 80 are provided. The two rollers 80 prevent the door shell 36 from hitting the fuselage structure, and also help secure the door shell 36 in the transverse direction of the airplane, since the support rollers 80 act under the roof ridge line of the fuselage 12.

As evident from FIG. 24, the door shell 36 has only a slight overhang relative to the fuselage 12 of the aircraft 10 when open, i.e., in the open setting 42. As a result, the fuselage nose door 34 can be opened and the aircraft 10 can be loaded and unloaded even in very windy weather, resulting in a higher reliability in use. The additional support provided by the support rollers 80 means that there is a third support as viewed both from the side and from the front, yielding an elevated stability in the open state 42 (see the triangle penciled in with a dashed line). With respect to laterally acting wind loads, the upper holding point 52 and lower holding point 54 in conjunction with the support roller 80 form three support points, so that the laterally acting wind loads on the door shell 36 can be transmitted to the fuselage structure 12.

The invention claimed is:

1. A fuselage nose door for sealing an opening in a hull of an aircraft, comprising:
   a door shell movably held by a bearing device between a closed setting and an open setting,
   wherein the door shell is pivotable and shiftable in relation to the bearing device;
   wherein the door shell is configured, via the bearing device, to slide along a guiding device extending in a longitudinal direction of the aircraft;
   wherein the opening in the hull is defined above a cockpit in a nose area of the aircraft and is configured to provide access to a loading area above the cockpit;
   wherein the door shell is configured to initially slide up while being moved from the closed setting to the open setting, whereafter at of the door shell is configured to pivot upward and to simultaneously slide rearward along a fuselage of the aircraft; and
   wherein in the fully open setting of the door shell, the door shell is configured to move over the fuselage of the aircraft.

2. The fuselage nose door of claim 1, wherein the door shell is pivotable transversely to a longitudinal axis of the aircraft, and shiftable in the transverse and longitudinal directions of the aircraft.

3. The fuselage nose door of claim 1, wherein the bearing device comprises first and second lateral bearings, each slidable in the guiding device, wherein the door shell is pivotable around the lateral bearings.

4. The fuselage nose door of claim 3, wherein each lateral bearing has a first holding point and a second holding point.

5. The fuselage nose door of claim 4, wherein the first holding point and the second holding point are guided in at least one guiding rail of the guiding device.

6. The fuselage nose door of claim 4, wherein the first holding point and the second holding point are arranged on the door shell immovably in relation to each other.

7. The fuselage nose door of claim 5, wherein the first holding point is guided in a first guiding rail of the guiding device and the second holding point is guided in a second guiding rail of the guiding device on each side, wherein the first guiding rail and the second guiding rail are vertically offset from one another, and progress at a varying distance from each other.

8. The fuselage nose door of claim 3, further comprising a first actuating means configured to vertically shift the bearings, and a second actuating means configured to horizontally shift the bearings.

9. The fuselage nose door of claim 1, further comprising a supporting device on an interior side of the door shell for supporting the door shell in the open setting on an exterior side of the fuselage of the aircraft.

10. The fuselage nose door of claim 1, wherein the closed setting has a latching position, and latching elements are provided on the door shell, so as to engage the aircraft fuselage with latching counter-pieces in the latching position, wherein the door shell is configured to be shifted toward the front in a longitudinal direction of the aircraft for unlatching purposes, before the door shell shifts upwardly.

11. An aircraft comprising:
 a fuselage structure, wherein the fuselage structure has a load-bearing structure and a cargo hold within the fuselage structure accessible from an opening in the hull in a front of the aircraft above a cockpit via a nose of the fuselage structure, the opening configured to provide access to a loading area above the cockpit in the cargo hold;
 first and second laterally adjoining wings; and
 a fuselage nose door for sealing the opening in a hull of the aircraft, comprising a door shell movably held by a bearing device between a closed setting and an open setting,
 wherein the door shell is pivotable and shiftable in relation to the bearing device;
 wherein the door shell is configured, via the bearing device, to slide along a guiding device extending in a longitudinal direction of the aircraft;
 wherein the door shell is configured to initially slide up while being moved from the closed setting to the open setting, whereafter a to of the door shell is configured to pivot upward and to simultaneously slide rearward along the fuselage structure of the aircraft; and
 wherein in the fully open setting of the door shell, the door shell is configured to move over the fuselage structure of the aircraft.

12. A method for opening and closing an opening in a hull of an aircraft with a fuselage nose door, the opening in the hull defined above a cockpit in a nose area of the aircraft and configured to provide access to a loading area above the cockpit, wherein the fuselage nose door has a door shell movably held by a bearing device between a closed setting and an open setting, the method comprising:
 pivoting and shifting the door shell in relation to the bearing device in the opening and closing process;
 wherein the shifting the door shell comprises sliding the door shell, via the bearing device, along a guiding device extending in a longitudinal direction of the aircraft;
 wherein the door shell is configured to initially slide up while being moved from the closed setting to the open setting, whereafter a to of the door shell is configured to pivot upward and to simultaneously slide rearward along a fuselage of the aircraft; and
 wherein in the fully open setting of the door shell, the door shell is configured to move over the fuselage of the aircraft.

13. The method of claim 12, further comprising:
 upwardly shifting the door shell so that a rear profile of the door shell moves over a fuselage profile of the aircraft; and
 shifting and simultaneously pivoting the door shell transverse to a longitudinal axis of the aircraft, wherein the door shell is upwardly pivoted in such a way that a front edge of the door shell moves over the fuselage profile of the aircraft.

14. The method of claim 12, further comprising shifting the door shell forward in a longitudinal direction prior to vertically shifting the door shell of the aircraft, during which the door shell is unlatched.

15. The fuselage nose door of claim 1, wherein a rear profile of the door shell is configured to move over a profile of the an aircraft fuselage.

16. The fuselage nose door of claim 15, wherein the rear profile of the door shell is configured to move generally parallel to the aircraft fuselage.

* * * * *

UNITED STATES PATENT AND TRADEMARK OFFICE
CERTIFICATE OF CORRECTION

PATENT NO. : 8,459,592 B2
APPLICATION NO. : 12/751000
DATED : June 11, 2013
INVENTOR(S) : Günter Pahl It is certified that error appears in the above-identified patent and that said Letters Patent is hereby corrected as shown below:

In the claims

Column 14, line 52, "at of the door" should read -- a top of the door --.
Column 16, line 1, "to of the door" should read -- top of the door --.
Column 16, line 21, "to of the door" should read -- top of the door --.
Column 16, line 42, "profile of the an" should read -- profile of an --.

Signed and Sealed this
Sixth Day of October, 2015

Michelle K. Lee
*Director of the United States Patent and Trademark Office*